M. POHLER.
MILK OR CREAM COOLER.
APPLICATION FILED JUNE 13, 1916.
1,280,294.
Patented Oct. 1, 1918.
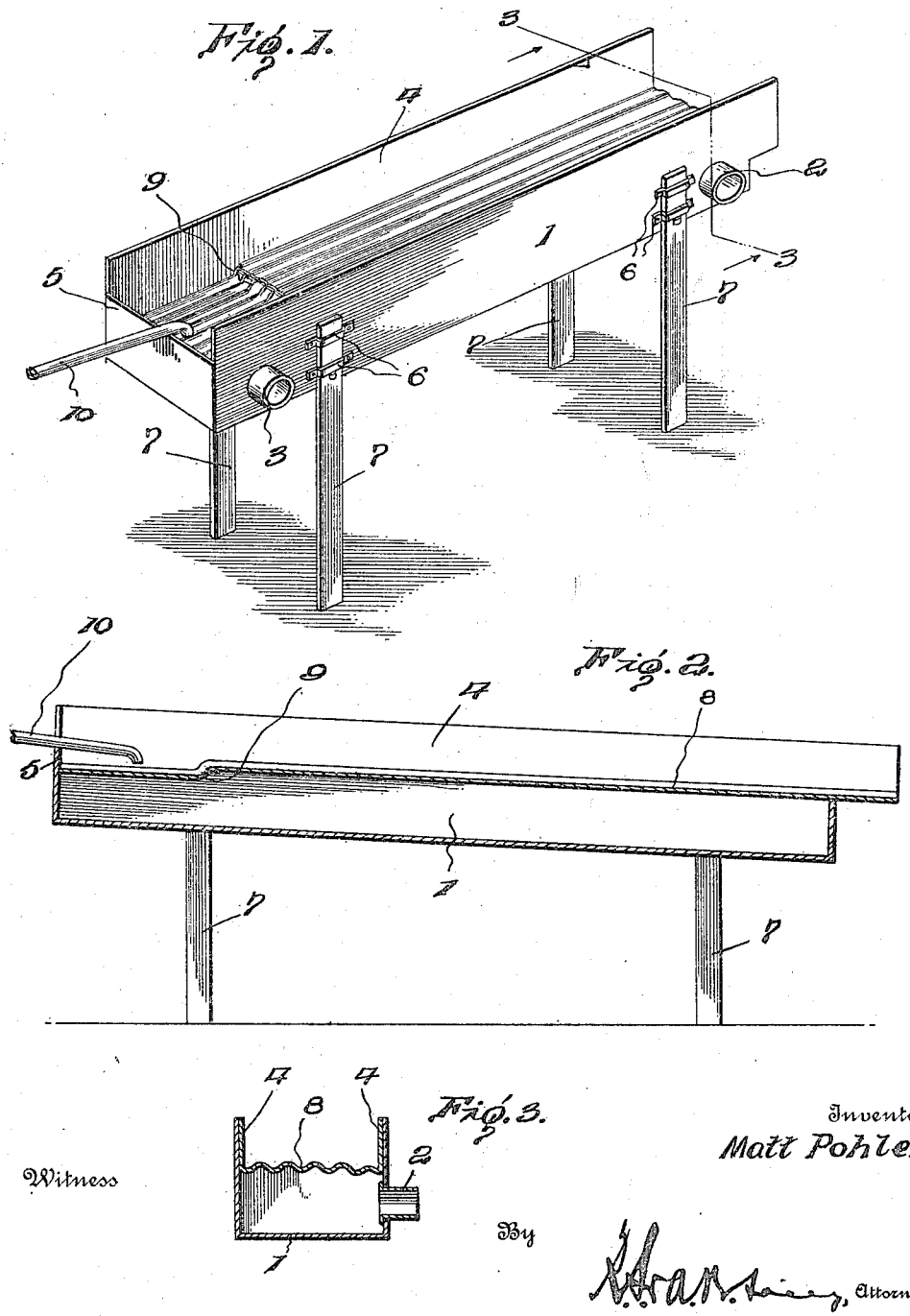
Inventor
Matt Pohler

UNITED STATES PATENT OFFICE.

MATT POHLER, OF ARCATA, CALIFORNIA.

MILK OR CREAM COOLER.

1,280,294.	Specification of Letters Patent.	Patented Oct. 1, 1918.

Application filed June 13, 1916. Serial No. 103,461.

*To all whom it may concern:*

Be it known that I, MATT POHLER, a citizen of the United States, residing at Arcata, in the county of Humboldt and State of California, have invented certain new and useful Improvements in Milk or Cream Coolers, of which the following is a specification.

This invention is an apparatus for cooling milk or cream and is capable of use generally, although it is intended more particularly for cooling cream or milk which has been passed through a separator. The object of the invention is to provide a simple and inexpensive device which may be operated by an unskilled person and by the use of which the entire body of the milk or cream will be reduced to an even temperature.

The invention is illustrated in the accompanying drawings and consists in certain novel features which will be particularly pointed out in the claims following a detailed description.

In the drawings:

Figure 1 is a perspective view of a cooler constructed in accordance with my invention;

Fig. 2 is a vertical longitudinal section of the same;

Fig. 3 is a transverse section on the line 3—3 of Fig. 1.

In carrying out my invention, I employ a tank 1 having a closed top, bottom, sides and ends and provided in one side with nipples 2 and 3, as shown in Fig. 1. The side walls of the tank are extended above the top of the same, as shown at 4, and one end wall extends somewhat above the top of the tank, as shown at 5. The side walls of the tank are equipped with sockets or brackets 6 in which are fitted supporting legs 7 whereby the tank may be set up at any convenient point. The legs more remote from the end wall 5 are shorter than the legs nearer said end wall so that the tank will be inclined from end to end, as shown clearly in Fig. 2. The top of the tank is corrugated or constructed with a plurality of longitudinal grooves 8 extending in parallel relation, with one portion of the top including its grooves below the line of the other part whereby a step 9 is formed in the top of the tank to form a shallow receptacle to receive the first inflow of the milk or cream. For the purpose of this description the portion of the top of the tank in advance of the step 9 is referred to as the upper portion, and the part which constitutes the shallow receptacle is referred to as the lower portion.

The corrugations forming the step 9 merge gradually by reversed curves into the adjacent portions of the corrugations, so that the milk or cream flows from the lower into the upper portion of the bottom without abrupt checking or being abnormally agitated. The milk or cream to be cooled may be poured from buckets or other receptacles onto the top of the tank between the step 9 and the end wall 5 or may be permitted to flow automatically and in a constant stream through a feed pipe 10 which may lead from the separator, as will be readily understood. Water pipes (not shown) are connected with the nipples 2 and 3 so that a circulation of water may be effected through the tank 1 when the device is in use.

It is thought the operation of my improved cooler will be readily understood. Water is caused to flow through the tank, either by reason of its natural head or by the operation of a pump, and the water will enter the tank at the lower end of the same and escape therefrom at the higher end thereof so that the circulation of the water will be in a direction opposed to the direction in which the milk or cream flows. The milk or cream will be fed into the shallow receptacle defined between the extended side walls of the tank, the end wall 5 and the step 9, and will overflow from said receptacle over the step 9 and pass through the longitudinal grooves or corrugations 8 to the lower open end of the cooler where it may discharge into any convenient receptacle. As the milk or cream flows from the receiving chamber, it will, of course be divided and pass from the longitudinal grooves or corrugations 8 in a plurality of fine, thin streams so that the entire body of milk or cream will be brought under the influence of the cooler temperature of the top of the tank. The cooler water will be located nearer the discharge end of the tank so that the milk or cream will not be damaged by too sudden chilling. As a result of this opposed circulation of the water and the milk or cream, the temperature of the milk or cream is gradually reduced, the water being gradually raised in temperature as it flows toward the receiving chamber for the milk and, consequently, the warm milk or cream deposited in the receiving chamber will be over water the temperature of which will be slightly below that of the milk or cream and the cooling will, consequently, be so gradual as to be beneficial.

My device is exceedingly simple in construction and may be manufactured and set up at a very low cost while the expense of repairing will be negligible.

Having thus described the invention, what is claimed as new is:

1. An apparatus of the class described comprising a tank inclined from end to end and provided with means for permitting the circulation of a cooling medium therethrough, an inclined longitudinally corrugated surface extending continuously from one end of the tank to the other and forming the top of said tank, one portion of the corrugated surface being disposed in a plane below the plane of the other portion thereof to form a retarding step located near the high end of the tank and merging from one portion to the other whereby the flow of liquid over said corrugated surface is retarded without agitating or abruptly checking the same.

2. An apparatus of the class described comprising a tank inclined from end to end, pipes disposed at the opposite ends of the tank to permit the circulation of a cooling medium therethrough, an inclined longitudinally corrugated surface extending continuously from one end of the tank to the other and forming the top of said tank, the side walls of the tank and one end wall at the high portion of the tank being extended above the corrugated surface, one portion of the corrugated surface being disposed in a plane below the plane of the other portion thereof to form a retarding step located near the extended end wall of the tank whereby the flow of liquid over said corrugated surface is retarded without agitating or abruptly checking the same, and a delivery pipe discharging on the corrugated surface between the step and the extended end wall of the tank.

In testimony whereof I affix my signature.

MATT POHLER. [L. S.]

Copies of this patent may be obtained for five cents each, by addressing the "Commissioner of Patents, Washington, D. C."